(12) United States Patent
Kluger et al.

(10) Patent No.: US 7,350,198 B2
(45) Date of Patent: Mar. 25, 2008

(54) CREATING AND CHECKING RUNTIME DATA TYPES

(75) Inventors: Gerd Kluger, Sinsheim (DE); Andreas Blumenthal, Heidelberg (DE); Helmut Prestel, Bad Schoernboarn (DE); Rolf Hammer, Karlsruhe (DE); Holger Janz, Ketsch (DE); Thomas Bareiss, Reilingen (DE)

(73) Assignee: SAP Aktiengesellschaft, Walldorf (DE)

( * ) Notice: Subject to any disclaimer, the term of this patent is extended or adjusted under 35 U.S.C. 154(b) by 878 days.

(21) Appl. No.: 10/657,709

(22) Filed: Sep. 9, 2003

(65) Prior Publication Data

US 2005/0055680 A1 Mar. 10, 2005

(51) Int. Cl.
G06F 9/45 (2006.01)
(52) U.S. Cl. ........................ 717/140; 717/143; 717/148
(58) Field of Classification Search ................. 717/140, 717/143, 148

See application file for complete search history.

(56) References Cited

U.S. PATENT DOCUMENTS

| 5,293,630 | A | 3/1994 | Tatge et al. |
| 5,371,891 | A | 12/1994 | Gray et al. |
| 5,410,705 | A | 4/1995 | Jones et al. |
| 6,052,526 | A | 4/2000 | Chatt |
| 6,142,684 | A | 11/2000 | Kirshenbaum et al. |
| 6,145,120 | A | 11/2000 | Highland |
| 6,446,259 | B2 | 9/2002 | Brett |
| 2003/0126590 | A1* | 7/2003 | Burrows et al. ............ 717/154 |

OTHER PUBLICATIONS

Keller, H. and Jacobitz, J., "ABAP Objects—The Official Reference", *SAP Press*, vol. 1, 2003 (cover and title page; pp. 89-95 and 186-192 (10 sheets)).
Snell, et al., "Reflection Part 2: Emit", *Code (Component Developer) Magazine*, Jan. 2003, retrieved from the internet, http://www.code-magazine.com/Article.aspx?quicki=0301051 on Jan. 25, 2006.
Richter, "Microsoft.NET Framework Delivers the Platform for an Integrated, Service-Oriented Web", *MSDN Magazine*, Sep. 2000, retrieved from the internet http://msdn.microsfot.com/msdnmag/issues/0900/framework/ on Jan. 25, 2006.
Huene, "Exploring the System Reflection Emit Namespace", *Devhood Tutorial*, Feb. 7, 2005, retrieved from the internet http://www.devhood.com/tutorials/tutorial_details.aspx?tutorial_it=238, on Jan. 25, 2006.
Weinreb, "Chris Date Identifies Major Flaws with OOP", *Newsgroup Message*, Nov. 8, 1993, retrieved from the internet http://groups.google.com/group.comp.databases.object/msg/3a234eb81493f369?dmode=source on Jan. 26, 2006.

* cited by examiner

*Primary Examiner*—William H. Wood
(74) *Attorney, Agent, or Firm*—Fish & Richardson P.C.

(57) ABSTRACT

Methods and apparatus, including computer program products, for defining and using data types at runtime. A procedural source code program is compiled to generate a compiled program having instructions to create a runtime data type and to use the runtime data type. The runtime data type has a compound structure of referenced data types. Instructions to create a runtime data type having a compound structure are executed by creating a runtime data type definition from the compound structure of referenced data types by resolving the referenced data types bottom up into data types known at runtime. A data object having the runtime data type is created. Type checking is performed on uses of the data object at runtime according to the runtime data type.

20 Claims, 3 Drawing Sheets

CREATING AND CHECKING RUNTIME DATA TYPES

BACKGROUND

The present invention relates to data processing by digital computer, and more particularly to a defining and using data types in a computer program executed by a digital computer.

A computer program provides instructions to direct and control the operation of a digital computer. A digital computer will be referred to as a computer. The instructions of a computer program may be developed using a programming language. In this specification, the use of the term instruction is not limited to a single machine-executable instruction. The term "instruction" is used as a convenience for the many ways in which a computer may be programmatically directed to perform a particular action. For example, instructions may be executed through the actions of an interpreter or a virtual machine running on a computer.

Programming languages may be classified in a variety of ways. In this specification, procedural programming languages are distinguished from functional programming languages. In a procedural programming language, programs are generally expressed as a sequence of statements and the order of statements affects the order in which the statements are performed. Examples of an procedural languages include COBOL, Fortran, and C.

By contrast, the statements of a computer program developed in a functional programming language represent a collection of functions such that each function has an input and a result. A function in the collection interacts with other functions in the collection to produce a result. Thus, a computer program written in a functional programming language is not programmed as a sequence of steps or operations. Haskell is an example of a functional programming language.

Some programming languages only allow data types known at compile time to be used for data typing—that is, checking to ensure that the use of a data object is consistent with the data type of the data object. An advantage of such compile-time data typing is the imposition of a set of rules on a programmer, which helps reduce programming errors. A disadvantage of such compile-time data typing is that only data types known at compile time may be used.

In most statically-typed programming languages, data types are only used at design-time to support the programmer in creating correct programs and discover errors during the development phase. As such, data types in statically-typed programming languages generally are not used at runtime. However, some statically-typed programming languages have the capability to use and check a generic data type, which is a partially-defined data type. In the programming language ABAP, for example, a generic data type defines a generic data structure (such as a table) without defining all the details, such as the particular types of data elements within the data structure. In such a case, only limited use checking can be performed. For example, the compiler can detect the error of a Boolean operation being performed on a generic table type, but it cannot detect errors related to the data type of a particular column, which is not know at compile time.

SUMMARY OF THE INVENTION

The invention contemplates the following scenario. A programmer develops an application in a typed procedural programming language. The programmer is able to create a new data type dynamically at runtime by defining a runtime data type from the compound structure of data types that are known at compile-time or previously-defined runtime data types. The programmer creates a data object having the runtime data type, and, thereafter, the use of the data object is checked to ensure that the data object is being used according to the runtime data type.

In general, in one aspect, a procedural source code program is compiled to generate a compiled program having instructions to create a runtime data type and to use the runtime data type. The runtime data type has a compound structure of referenced data types. Instructions to create a runtime data type having a compound structure are executed by creating a new data type definition from the compound structure of referenced data types by resolving the referenced data types bottom up into data types known at runtime. A data object having the runtime data type is created. Type checking is performed on uses of the data object at runtime according to the runtime data type.

The invention can be implemented to include one or more of the following advantageous features. The runtime data type is assigned to a data object. The data types are defined using type definitions generated by compiling the source code program. The instructions to create a runtime data type and the instructions to use the runtime data type are executed by a virtual machine. The type definitions for the data types are stored in a storage area managed by the virtual machine. The new type definition is stored in a local area for the computer program managed by the virtual machine.

The new type definition is a type object. The type object is managed as an element in a class hierarchy and subject to garbage collection. The type object is referenced programmatically in the source code program by a handle and not by a name.

The invention can be implemented to provide a programmer with the ability to use static type checking at compile time and the ability to create and use runtime data types. Thus, the invention provides a programmer with the benefits of type checking at compile time without sacrificing desirable flexibility to create and use new data types runtime.

BRIEF DESCRIPTION OF THE DRAWINGS

Like reference numbers and designations in the various drawings indicate like elements.

DETAILED DESCRIPTION

Figure 1:
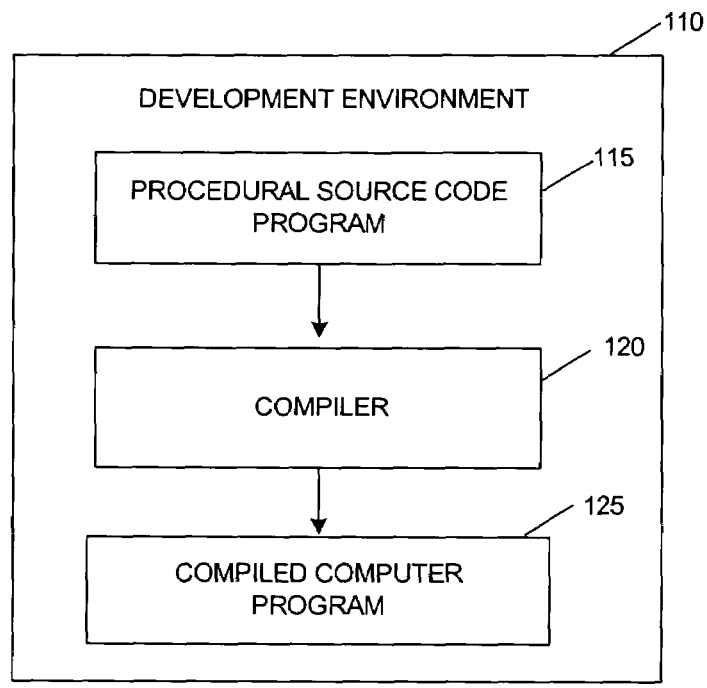
FIG. 1 is a block diagram of a system incorporating various aspects of the invention.
Figure 1:
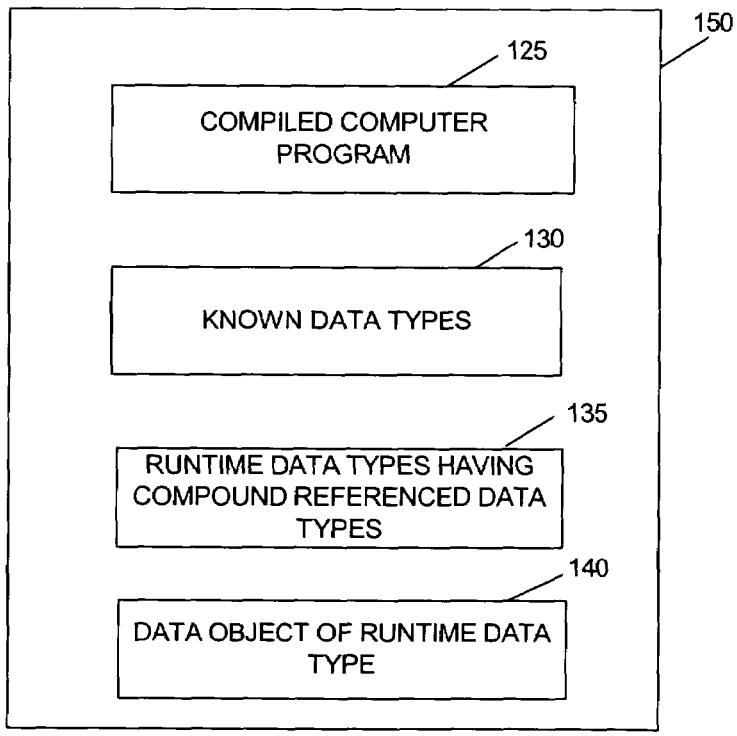

As shown in FIG. 1, a system 100 in accordance with the invention includes a development environment 110 for developing source code 115 and having a compiler 120 for a procedural programming language. A programmer uses the development environment 110 to write source code 115 that calls appropriate statements to procedurally and explicitly create a data type at runtime. The runtime data type is defined based on simpler data types known at compile-time. This bottom-up approach to constructing a runtime data type enables easy type variations, such as creating projections on structures and adding components to existing structures.

More particularly, the compiler 120 processes the source code 115 to generate a compiled computer program 125.

When the source code is programmed in accordance with the invention, the compiled computer program 125 will have instructions to create a runtime data type having a compound structure of referenced data types. The compiled computer program 125 will also have instructions to use the runtime data type.

The computer program 125 will be run (executed) on a computer, which may or may not be the computer on which it was developed. In FIG. 1 illustrates the computer program being run on a computer 150. This computer 150 has known data types 130 that are data type definitions accessible at runtime for use in creating a runtime data type. When the computer program 125 is executed, it creates one or more runtime data types 135. Each runtime data type can have a compound data structure that is created as a runtime data type definition by the computer program 125. A runtime data type definition defines a runtime data type in terms of known data types. Thus, the runtime type definition is a structure, generally a compound structure, of known data types. When the runtime type definition is created, the data types in the runtime type definition are resolved bottom up into data types known at runtime before the new data type was created. These known data types can be data types that are primitives in the programming language or that are defined by program constructs evaluated at compile time and provided to the runtime computer with the compiled computer program 125, or the known data types can be previously-defined runtime data types. The computer program 125 can assign the runtime data type 135 to a data object 140, and the use of the data object at runtime can be checked against the runtime data type. This checking can conveniently be done by a runtime environment, e.g., a virtual machine, in which or by which the computer program 125 is executed.

Figure 2:
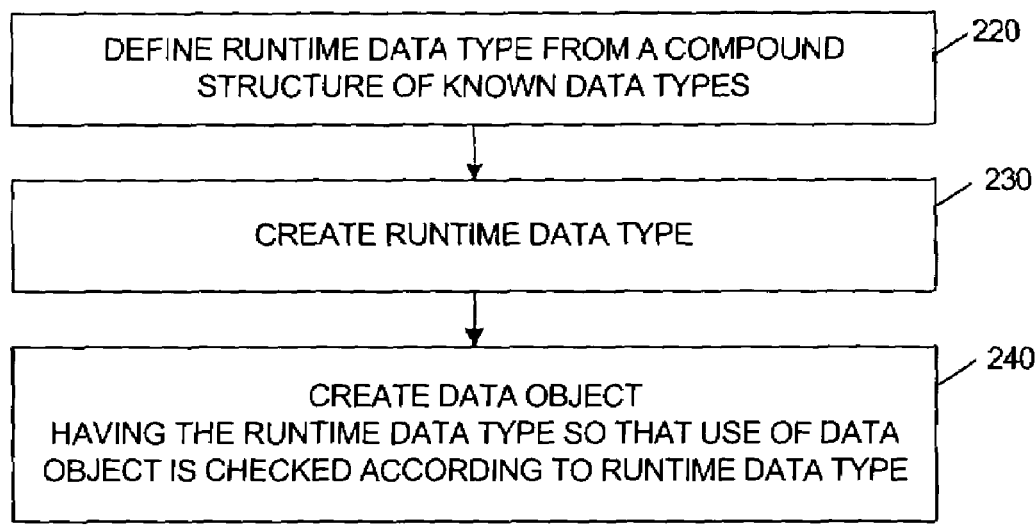
FIG. 2 is a flow chart of a process for creating and using runtime data types.

FIG. 2 shows a process 200 for creating and using a runtime data type from the perspective of a programmer writing statements in source code. In this example, the runtime data type is a structured data type that includes multiple data type components. The programmer writes a statement to define a runtime data type from a compound structure of known data types (step 220). Typically, the programmer writes a series of statements in which each statement identifies one data type to be included in the compound structure of known data types used to define the runtime data type. The programmer also writes a statement to create the runtime data type (step 230). When the statement is executed, the runtime data type is created from the compound structure of data types by resolving the data types bottom up.

The programmer creates a data object having the runtime data type (step 240). The compiled computer program (or its runtime environment) checks each use of the data object to ensure that the data object is being used according to the runtime data type. In some implementations, a programmer can assign a runtime data type to a previously-created data object.

The steps in process 200 do not necessarily correspond to separate statements in the source code. For example, in some implementations, a single source statement performs the creation of a runtime data type by creating a data object and assigning a handle to the data object, as described below.

A specific implementation of a runtime environment and an implementation of programming language constructs to create and use runtime data types in the ABAP programming language will now be described. (Development tools and runtime environments for ABAP programs are available from SAP AG of Walldorf, Germany.)

An ABAP compiler processes source code to generate intermediate code that is processed by a runtime environment. The runtime environment is a virtual machine that stores the intermediate code and referenced data type definitions.

For the virtual machine to be able to do a dynamic data check at runtime, the reference data type definitions must be available in a suitable form. To this end, the compiler holds the type information in appropriate tables (called load tables) together with the program code proper (intermediate code), which the virtual machine loads before execution. The tables describe the type, for example, the type name, the layout of the type in memory, and any involved subtypes. Each data object used in a program includes a reference to its own data type. Other information is also available for improving the performance of operations on data objects, for example, an initial value for rapid initialization of data objects, views of (nested) structures for efficient structure handling, and a hash value of the technical properties of the type for rapid compatibility testing.

In the case of types available at compile-time, the compiler creates all of the necessary type information and holds the type information in the load tables for use. By contrast, to support runtime data types, the information is created at runtime and held in an appropriate place. While different programs can share load tables (which are held in shared memory), runtime data types are local to the executing program that created them. The runtime data types are held in the roll area of that program. (A roll area is a user-specific work area in main memory, available for the duration of a transaction and managed dynamically by the system.) The infrastructure for accessing the data is the same, so access to the type information is transparent and does not depend on whether the data type is in shared memory or the roll area. This makes it possible to use data objects of runtime data types in the same places where data objects of a static type are conventionally used. In addition, the runtime data types are transient—that is, runtime data types are limited to the lifetime of the internal mode. Alternatively, dynamic types can be made persistent. However, making runtime data types transient is advantageous in that memory for transient runtime data types can be managed with garbage collection.

Figure 3:
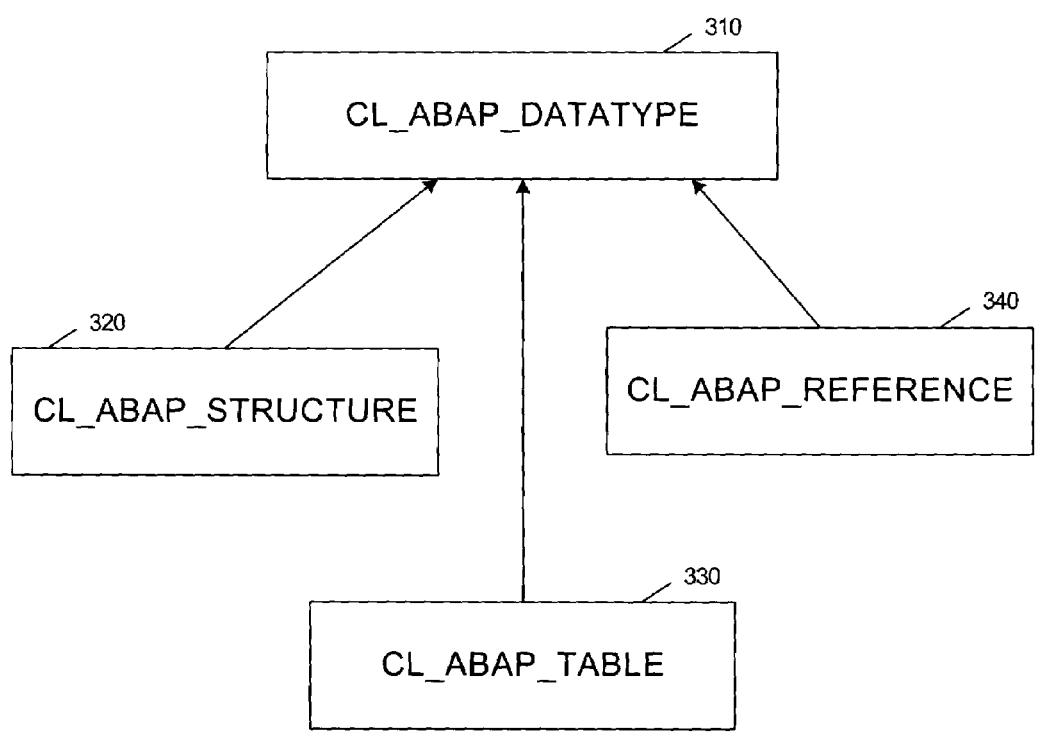
FIG. 3 is a class hierarchy for a type model.

Shown in FIG. 3 is a class hierarchy 300 for a type model that provides a programmatic interface to data type information for use in creating and using runtime data types. A programmer uses the class hierarchy 300 to obtain type handles for data type definitions and uses the type handles to programmatically specify a structure, generally a compound structure, of data types to define a runtime data type. A runtime data type is an instance of a type class and so a runtime data type is created by creating a data object (which will be referred to as a type object) that specifies the runtime data type. Thus, for each runtime data type, there is one corresponding type object. When the runtime data type is represented by a type object and not by a type name, the runtime data type is nameless. In this procedural approach, the use of a handle is preferred over the use of the type name to access a runtime data type. A handle is a reference to a corresponding type object.

The class hierarchy 300 has a class CL_ABAP_DATATYPE 310, a class CL_ABAP_STRUCTURE 320, and a class CL_ABAP_REFERENCE 340.

The class CL_ABAP_DATATYPE 310 is the most general class in the class hierarchy 300 and provides an interface to types that can be generally used to define runtime data types, such as access to elementary data types and references to named types. The methods in the class CL_ABAP_

DATATYPE 310 provide a way to obtain base types required to compose complex types in a runtime data type. The class definition for the class CL_ABAP_DATATYPE 310 appears below.

```
CLASS cl_abap_datatype DEFINITION
  CREATE PROTECTED.
PUBLIC SECTION.
  CLASS-METHODS:
    get_c
      IMPORTING value(length) TYPE i
      RETURNING value(r) TYPE REF TO cl_abap_datatype,
    get_p
      IMPORTING value(length) TYPE i
        value(decimals) TYPE i
      RETURNING value(r) TYPE REF TO cl_abap_datatype,
    ...
    get_string
      RETURNING value(r) TYPE REF TO cl_abap_datatype,
    get_by_name
      IMPORTING value(name) TYPE string
      RETURNING value(r) TYPE REF TO cl_abap_datatype,
    get_from_rtti
      IMPORTING value(descr) TYPE REF TO cl_abap_datadescr
RETURNING value(r) TYPE REF TO cl_abap_datatype.
```

The class CL_ABAP_STRUCTURE 320 is used to create structures and inherits from CL_ABAP_DATATYPE 310. The class CL_ABAP_STRUCTURE 320 provides a component table that is an internal table that defines each of the components of the structure. Each component has a name and a data type, and the data type is always represented by a type object. The class definition for the class CL_ABAP_STRUCTURE 320 appears below.

```
CLASS cl_abap_structure DEFINITION
 INHERITING FROM cl_abap_datatype
 CREATE PROTECTED.
 PUBLIC SECTION.
  TYPES:
   BEGIN OF component,
    name TYPE string,
    type TYPE REF TO cl_abap_datatype,
   END OF component,
   component_table TYPE STANDARD TABLE OF component WITH
     KEY name.
  CLASS-METHODS:
   get_structure_by_name
    IMPORTING value(name) TYPE string
    RETURNING value(r) TYPE REF TO cl_abap_structure,
   create_from_component_table
    IMPORTING value(components) TYPE component_table
    RETURNING value(r) TYPE REF TO cl_abap_structure.
  METHODS:
   get_components
    RETURNING value(r) TYPE component_table.
ENDCLASS.
```

The class CL_ABAP_STRUCTURE 320 has a factory method create_from_component_table that creates and returns a structure type object for a component table. There is also a convenience method get_components that returns, for any named structure, a reference to the associated structure type object. The get_components method can be used for a structure type object to return the corresponding component table, which, in turn, can be used to create another structure. This is one way to use the class hierarchy 300 to make type variations.

The class CL_ABAP_TABLE 330 is used to create table data types and the class 330 inherits from the class CL_ABAP_DATATYPE 310. The class CL_ABAP_TABLE 330 provides the table type (STANDARD, SORTED, or HASHED), the key table, and the line type. The key table is an internal table of strings that defines the names of the key fields if the line type is structured. The line type itself is any object of type CL_ABAP_DATATYPE 310. The class CL_ABAP_TABLE 330 has one factory method, create_from_line_type, to create a table type from any line type. The create_from_line_type method provides an option of specifying a key table and the UNIQUE property. The class CL_ABAP_TABLE 330 has a convenience method, get_table_by_name, that provides a reference to the corresponding type object for a named table type.

The class CL_ABAP_REFERENCE 340 is used to create reference types. It inherits from CL_ABAP_DATATYPE 310. The class CL_ABAP_REFERENCE 340 is the abstraction of a reference type, such as a data reference or an object reference. The class CL_ABAP_REFERENCE 340 has a factory method create_from_base_typedescr that creates a corresponding reference type object for a base type descriptor. The convenience method ref_to_data provides a reference to the reference type object corresponding to a data reference, whereas the convenience method ref_to_object provides a reference to the reference type object corresponding to an object reference. The class definition for the class CL_ABAP_REFERENCE 340 appears below.

```
CLASS cl_abap_reference DEFINITION
  INHERITING FROM cl_abap_datatype
  CREATE PROTECTED.
  PUBLIC SECTION.
   CLASS-METHODS:
    create_from_base_typedescr
     IMPORTING value(base_typedescr) TYPE REF
      TO cl_abap_typedescr
     RETURNING value(r) TYPE REF TO cl_abap_reference,
    get_ref_to_data
     RETURNING value(r) TYPE REF TO cl_abap_reference,
    get_ref_to_object
     RETURNING value(r) TYPE REF TO cl_abap_reference.
   METHODS:
    get_base_typedescr
     RETURNING value(r) TYPE REF TO cl_abap_typedescr.
ENDCLASS.
```

In application programming, variations of existing structures frequently need to be created. A programmer can use the class hierarchy 300 to create runtime data types based on existing data types.

In the following example, a programmer uses the methods of CL_ABAP_STRUCTURE 320 to obtain data type information to create a runtime data type that is a compound structure of referenced data types. To do so, the programmer can write the following statements:

```
DATA: struc_tab TYPE cl_abap_structure=>component_table,
      struc_cmp LIKE LINE OF struc_tab.
struc_cmp-name = 'name'.
struc_cmp-type = cl_abap_datatype=>get_c( 20 ).
APPEND struc_cmp TO struc_tab.
struc_cmp-name = 'address'.
struc_cmp-type = cl_abap_datatype=>get_by_name( 'address' ).
APPEND struc_cmp TO struc_tab.
struc_type = cl_abap_structure=>
  create_from_component_table( struc_tab ).
```

The programmer iteratively uses the struc_cmp-name statement to provide a name to each data component and the struc_cmp-type statement to get the handle for the reference data type to be used in the component. By naming the data components, a programmer can later use the name to refer to a data component. The data components are added to the compound structure of the runtime data type. To use the structure, the component table is passed to the create method create_from_component_table to create a structure with the compound structure of referenced data types.

In the following example, a programmer uses the methods of the CL_ABAP_STRUCTURE 310 to obtain data type information to be used to create a runtime data type that is a projection of an existing structure in a dictionary. To do so, the programmer can use the following statements:

```
DATA: struc_tab TYPE cl_abap_structure=>component_table,
      struc_type TYPE REF TO cl_abap_structure.
struc_type = cl_abap_structure=>get_structure_by_name( 'spfli' ).
struc_tab = struc_type->get_components( ).
DELETE TABLE struc_tab WITH TABLE KEY name = 'period'.
struc_type =
cl_abap_structure=>create_from_component_table(struc_tab).
```

Here the programmer obtains the reference data of a particular structure that is to be used as the base for the projected structure by using the get_structure_by_name method and the get_components( ) method. The get_structure_by_name ('spfli') method returns the structure that has the name "spfli," and the get_components( ) method returns all of the components of the structure. The programmer then modifies the components of the returned structure so that the modified structured has only the components that the programmer needs in the projected structure. To use the structure, the component table is passed to the create method create_from_component_table to create the structure type with the compound structure of referenced data types.

Thus, as shown, projection of a data structure by omitting individual components and the extension of existing structures by adding components can be performed using the class hierarchy 300.

Once the compound structure of referenced data types for a runtime data type is defined, a programmer can create a data object from the runtime data type. There are different ways to implement this functionality.

In one implementation, the syntax of the CREATE DATA statement is modified to allow expression of the creation of a data object having a runtime data type. The CREATE DATA statement is modified to have a TYPE HANDLE argument, as shown below:

CREATE DATA dref TYPE HANDLE type_handle . . .

The CREATE DATA statement returns a data object and a reference to the data object (here, dref) that is used to access the data object. The data object is of the type specified by the type_handle. To create a data object other than a runtime data type, the conventional CREATE DATA statement is used without the TYPE HANDLE argument.

Alternatively, or in addition, a method create_data_object( ) for CL_ABAP_DATATYPE 310 can be implemented to return an anonymous data object. In this way, every type is able to create data objects of its own type, as shown below:

dref=type_handle->create_data_object( ).

Another alternative is to implement an absolute name attribute in the class CL_ABAP_DATATYPE 310 to return an absolute type name, a name that is unique in the scope of the running program, which then is used as used at runtime in a conventional CREATE DATA statement. The data object is then created using the conventional CREATE DATA statement, as shown below:

CREATE DATA dref TYPE (type_handle->absolute_name).

The construction "(type_handle->absolute_name)" causes the text of the absolute name of the data type to be included in the CREATE DATA statement before it is executed by the virtual machine.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention has been described in terms of particular embodiments. Other embodiments are within the scope of the following claims. For example, the steps of the invention can be performed in a different order and still achieve desirable results.

What is claimed is:

1. A computer program product, embodied on a machine readable storage device, comprising instructions operable to:
    compile a procedural source code program to generate a compiled program having instructions to create a runtime data type having a compound structure of referenced data types and having instructions to use the runtime data type;

create, at compile time, data type definitions for the reference data type included in the compiled program and known at compile time;

execute, at runtime, the instructions to create a runtime data type having a compound structure by creating a runtime data type definition based on the compound structure of referenced data types and the data type definitions for the referenced data types created at compile time;

create a data object having the runtime data type based on the runtime data type definition; and perform type checking on uses of the data object at runtime according to the runtime data type.

2. The product of claim 1, wherein:

instructions operable to create a data object having the runtime data type comprise instructions operable to assign the runtime data type to a data object.

3. The product of claim 1, wherein:

the data types included in the compound structure and used to create the runtime data type definition comprise data types defined by type definitions generated by compiling the source code program.

4. The product of claim 1, wherein:

the instructions to create a runtime data type and the instructions to use the runtime data type are executed by a virtual machine; and the data type definitions for the referenced data type are stored in a storage area managed by the virtual machine.

5. The product of claim 4, wherein:

the runtime type definition is stored in a local area for the computer program managed by the virtual machine.

6. The product of claim 1, wherein:

the runtime type definition is a type object.

7. The product of claim 6, wherein:

the type object is managed as an element in a class hierarchy.

8. The product of claim 6, wherein:

the type object is subject to garbage collection.

9. The product of claim 6, wherein:

the type object is referenced programmatically in the source code program by a handle and not by a name.

10. The product of claim 1, wherein:

the runtime data type is defined by a programmer to create a new data type dynamically at runtime.

11. The product of claim 1, wherein:

the data type definitions for the referenced data types included in the compiled program and known at compile time includes:

a first data type definition that defines a first structure that includes a first data component, and a second data type definition that defines a second data component not included in the first structure, the second data type definition being different from the first data type definition and the second data component being different from the first data component;

the compound structure of referenced data types comprises a compound structure that includes at least the first data component included in the first structure and the second data component; and creating a runtime data type definition based on the compound structure of referenced data types and the data type definition for the referenced data types created at compile time comprises creating a runtime data type definition that defines a second structure that includes the first data component included in the first structure and the second data component.

12. A computer system comprising:

one or more programmable processors and a machine-readable storage device;

a compile-time executable software module, stored on the machine-readable storage device, including instructions that, when executed by the one or more programmable processors, are operable to:

compile a procedural source code program to generate a compiled program having instructions to create a runtime data type having a compound structure of referenced data types and having instructions to use the runtime data type; and create, at compile time, data type definitions for the referenced data types included in the compile program and known at compile time; and a runtime executable software module, stored on the machine-readable storage device, including instructions that, when executed by the one or more programmable processors, are operable to:

execute, at runtime, the instructions to create a runtime data type having a compound structure by creating a runtime data type definition based on the compound structure of referenced data types and the data type definitions for the referenced data types created at compile time;

create a data object having the runtime data type based on the runtime data type definition; and perform type checking on uses of the data object at runtime according to the runtime data type.

13. The system of claim 1, wherein:

creating a data object having the runtime data type comprises assigning the runtime data type to a data object.

14. The system of claim 1, wherein:

the data types included in the compound structure and used to create the runtime data type definition comprise data types defined by type definitions generated by compiling the source code program.

15. The system of claim 1, wherein:

the runtime executable software module is a virtual machine.

16. The system of claim 1, wherein:

the runtime type definition is a type object.

17. A method performed by a data processing apparatus, the method comprising:

compiling a procedural source code program to generate a compiled program having instructions to create a runtime data type having a compound structure of referenced data types and having instructions to use the runtime data type;

creating, at compile time, data type definitions for the referenced data types included in the compiled program and known at compile time;

executing, at runtime, the instructions to create a runtime data type having a compound structure by creating a new data type definition based on the compound structure of referenced data types and the data type definitions for the referenced data types created at compile time;

creating a data object having the runtime data type based on the new data type definition; and performing type checking on uses of the data object at runtime according to the runtime data type.

18. The method of claim 17 wherein
creating a data object having the runtime data type comprises assigning the runtime data type to a data object.
19. The method of claim 17, wherein:
the types included in the compound structure to create the runtime data type definition comprise data types defined by type definitions generated by compiling the source code program.
20. The method of claim 17, wherein:
the new data type definition is a type object.

* * * * *